United States Patent
Urbach et al.

[11] Patent Number: 5,997,208
[45] Date of Patent: Dec. 7, 1999

[54] ADJUSTMENT FOR A BALL JOINT ASSEMBLY

[75] Inventors: Brian A. Urbach, Rochester Hills; Gordon J. Decker, Richmond; Jack Jaroneski, Shelby Township, all of Mich.

[73] Assignee: TRW Inc., Lyndhurst, Ohio

[21] Appl. No.: 09/089,193

[22] Filed: Jun. 2, 1998

[51] Int. Cl.⁶ .................. F16D 1/12; F16C 11/06
[52] U.S. Cl. .................... 403/137; 403/133; 403/135
[58] Field of Search .................... 403/122, 132, 403/133, 135, 137, 140, 362; 411/393

[56] References Cited

U.S. PATENT DOCUMENTS

| | | | |
|---|---|---|---|
| 1,693,840 | 12/1928 | Faudi . | |
| 1,919,178 | 7/1933 | Todd | 403/137 |
| 1,976,983 | 10/1934 | Chandler | 403/137 |
| 2,811,377 | 10/1957 | Latzen . | |
| 3,409,317 | 11/1968 | Richards . | |
| 4,187,033 | 2/1980 | Zukowski | 403/137 |
| 5,116,159 | 5/1992 | Kern, Jr. et al. | 403/137 X |
| 5,286,131 | 2/1994 | Wood . | |
| 5,380,114 | 1/1995 | Urbach . | |

*Primary Examiner*—Harry C. Kim
*Assistant Examiner*—John R. Cottingham
*Attorney, Agent, or Firm*—Tarolli, Sundheim, Covell, Tummino & Szabo L.L.P.

[57] ABSTRACT

A ball joint assembly (10) includes a housing (12) having a socket chamber (20). A bearing (22) is disposed in the socket chamber. A ball stud has a head end portion (30) enclosed by the bearing (22) and a shank portion (34) which extends out of the housing (12). A retainer (38) applies force against an outer end portion (40) of the bearing (22) to press an inner end portion (44) of the bearing firmly against a locating surface (46) of the housing. A torque adjustment assembly (64) is operable to adjust the torque required to rotate the ball stud (32) about a longitudinal central axis (36) of the shank portion (34). The torque adjustment assembly (64) includes a force transmitting member (70) and an adjustment member (72). The adjustment member (72) is operable to press the force transmitting member (70) against the flexible inner end portion (26) of the bearing to vary the force applied against the head end portion (30) of the ball stud (32).

3 Claims, 1 Drawing Sheet

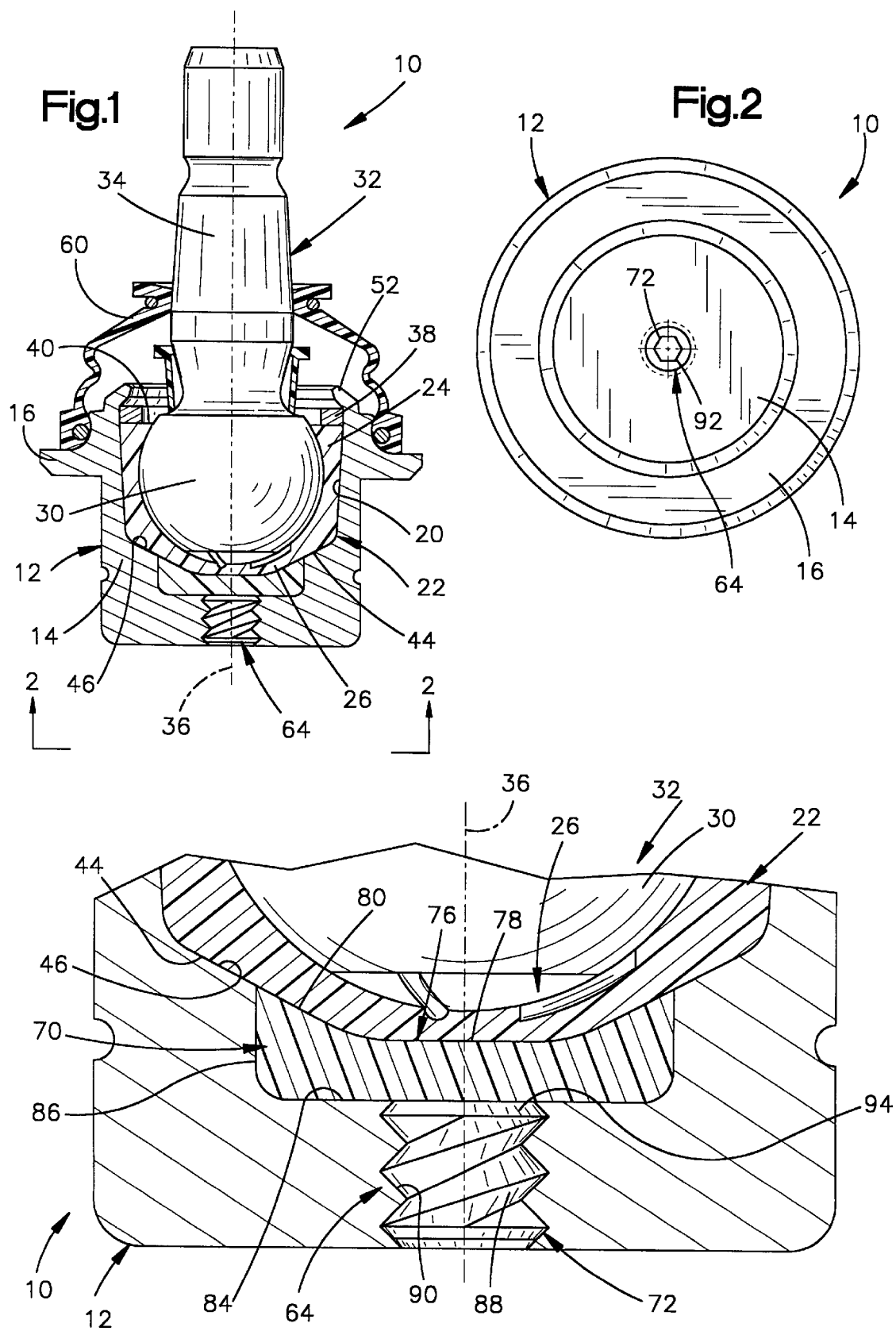

5,997,208

ADJUSTMENT FOR A BALL JOINT ASSEMBLY

BACKGROUND OF THE INVENTION

The present invention relates to a ball joint assembly, and more specifically to a ball joint assembly in which the amount of torque required to rotate a ball stud can be adjusted.

A known ball joint assembly has a housing with a socket chamber. A bearing is disposed in the socket chamber. A ball stud has a head end portion enclosed by the bearing and a shank portion extending out of the housing. A retainer ring is provided to hold the bearing in the housing. A ball joint assembly having this known construction is disclosed in U.S. Pat. No. 5,380,114.

SUMMARY OF THE INVENTION

An improved ball joint assembly includes a housing having a socket chamber in which a bearing is disposed. The head end portion of a ball stud is enclosed by the bearing. A retainer applies force against an outer end portion of the bearing to press an inner end portion of the bearing against a locating surface.

In accordance with a feature of the present invention, a torque adjustment assembly is provided to adjust the torque required to rotate the ball stud about a central axis of the shank portion of the ball stud. The torque adjustment assembly is operable to vary the force applied against the head end portion of the ball stud. The torque adjustment assembly may apply force against a flexible end wall of the bearing to press the end wall of the bearing against the head end portion of the ball stud.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein:

FIG. 1 is a sectional view of a ball joint assembly constructed in accordance with the present invention;

FIG. 2 is an end view, taken generally along the line 2—2 of FIG. 1, further illustrating the construction of the ball joint assembly; and FIG. 3 is an enlarged fragmentary view of a portion of FIG. 1.

DESCRIPTION OF ONE SPECIFIC PREFERRED EMBODIMENT OF THE INVENTION

A ball joint assembly 10 constructed in accordance with the present invention is illustrated in FIG. 1. The ball joint assembly 10 includes a rigid metal housing 12 having a generally cylindrical main section 14 and an annular mounting flange 16. The housing 12 defines a socket chamber 20. The housing 12 may be cold formed or machined as one piece.

A bearing 22 is disposed within the socket chamber 20. The bearing 22 may be injection molded from a suitable polymeric material, such as DELRIN™. The bearing 22 includes a side wall 24 and a circular end wall 26.

The bearing 22 supports a spherical head end portion 30 of a steel ball stud 32. The ball stud 32 has a generally cylindrical shank portion 34 which is integrally formed as one piece with the head end portion 30. When the ball stud 32 is in the position shown in FIG. 1, the housing 12, bearing 22, and ball stud 32 have coincident central axes 36 which extend through the center of the head end portion 30 of the ball stud 32. The bearing 22 supports the ball stud 32 for pivotal movement in a direction transverse to the axis 36 and for rotational movement about the axis 36.

A rigid annular metal retainer ring 38 is disposed in the socket chamber 20 and abuts an annular outer end surface 40 on the side wall 24 of the bearing 22. The retainer ring 38 applies an axially inward directed force against the annular end surface 40 of the side wall 24. This force presses an annular surface area 44 on the end wall 26 of the bearing 22 firmly against an annular locating surface area 46 (FIGS. 1 and 3) on the housing 12. In the illustrated embodiment of the invention, the surface area 44 on the bearing 22 and the surface area 46 on the housing 12 are formed as portions of right circular cones having longitudinal central axes which are coincident with the axis 36.

An annular metal flange 52 (FIG. 1) is formed on the outer end of the housing 12 and extends radially inward to apply pressure against the retainer ring 38 and the bearing 22. The pressure applied by the flange 52 against the retainer ring 38 presses the surface area 44 on the bearing 22 firmly against the surface area 46 on the housing 12 to securely hold the bearing 22 and head end portion 30 of the ball stud 32 against axial movement relative to the housing, that is, against movement in a direction generally parallel to the longitudinal central axis 36.

A boot assembly 60 engages the outside of the housing 12 and the shank portion 34 of the ball stud 32 to seal the open upper (as viewed in FIG. 1) end of the housing 12. The boot assembly 60 is flexible to accommodate pivoting or tilting movement of the shank portion 34 of the ball stud 32 about the center of the generally spherical head end portion 30 of the ball stud. The shank portion 34 of the ball stud 32 is rotatable relative to the boot assembly 60 to accommodate rotation of the ball stud 32 about the axis 36.

In accordance with a feature of the present invention, a torque adjustment assembly 64 (FIGS. 1 and 3) is provided to enable the torque or force required to rotate the shank portion 34 of the ball stud 32 about the axis 36 to be adjusted. Actuation of the torque adjustment assembly 64 varies the force applied against the flexible end wall 26 of the bearing 22.

When it is desired to increase the torque required to rotate the ball stud 32 about the axis 36, the torque adjustment assembly 64 is actuated to increase the force transmitted through the flexible end wall 26 of the bearing 22 to the head end portion 30 of the ball stud. Similarly, when it is desired to reduce the torque required to rotate the ball stud 32 about the axis 36, the torque adjustment assembly 64 is actuated to reduce the force transmitted through the flexible end wall 26 of the bearing 22 to the head end portion 30 of the ball stud.

In the illustrated embodiment of the invention, the torque adjustment assembly 64 includes a circular force transmitting member or block 70 and an actuator member or set screw 72. The force transmitting member 70 has an inner side surface 76 with the same configuration as the flexible end wall 26 of the bearing 22. Thus, the inner side surface 76 of the force transmitting member 70 includes a circular central portion 78 and an annular rim portion 80 which flares radially and axially outward from the central portion 76. In addition, the force transmitting member 70 has a circular end surface 84 which extends parallel to the circular inner side surface 76 of the force transmitting member 70. A cylindrical side surface 86 extends between the end surface 84 and the rim portion 80 of the force transmitting member 70.

In the illustrated embodiment of the invention, the actuator member 72 is a set screw. The set screw 72 is rotatable relative to the housing 12 to vary the force transmitted through the force transmitting member 70 and flexible end wall 26 of the bearing 22 to the head end portion 30 of the ball stud 32. The actuator member 72 has an external thread 88 which engages an internal thread 90 on the housing 12. A socket 92 (FIG. 2) is disposed in the actuator member 72 and is engageable by a suitable tool to rotate the actuator member relative to the housing 12. An end portion 94 of the actuator member 72 is disposed in abutting engagement with the force transmitting member 70.

Although the torque adjustment assembly 64 is operable to vary the amount of torque required to rotate the ball stud 32 about the longitudinal central axis 36 of the shank portion 34, the bearing 22 and head end portion 30 of the ball stud are securely held against movement relative to the housing 12 in a direction extending along the longitudinal axis 36. This is because the annular flange 52 on the housing 12 firmly presses the retainer ring 38 against the end surface 40 of the side wall 24 of the bearing 22. This force results in the annular surface area 44 on the bearing 22 being pressed firmly against the inner side surface 46 by the housing 12. Therefore, there is no end play of the bearing 22 in the socket chamber 20. However, the torque adjustment assembly 64 can be actuated to vary the force or torque required to rotate the ball stud 32 about the central axis 36 of the shank portion 34 of the ball stud.

From the above description of the invention, those skilled in the art will perceive improvements, changes and modifications. Such improvements, changes and modifications within the skill of the art are intended to be covered by the appended claims.

Having described the invention, the following is claimed:

1. A ball joint assembly comprising:
   a housing having a socket chamber;
   a polymeric bearing disposed in said socket chamber, said bearing having a bearing chamber, a first end portion defining an opening into said bearing chamber, and a second closed end portion opposite said first end portion, said second closed end portion being closed by a flexible end wall of said bearing;
   a ball stud having a head end portion located in said bearing chamber and a shank portion extending out of said housing and out of said bearing chamber through said opening defined by said first end portion of said bearing;
   a retainer disposed in engagement with said first end portion of said bearing, said retainer being effective to press said bearing against a surface on said housing to hold said bearing and head end portion of said ball stud against movement in a direction parallel to a longitudinal central axis of said shank portion of said ball stud; and
   torque adjustment means for adjusting torque required to rotate said ball stud about the central axis of said shank portion of said ball stud, said torque adjustment means including means for applying force against said flexible end wall of said bearing in the direction of said longitudinal central axis and for changing the force applied against said flexible end wall of said bearing;
   said means for applying force against said flexible end wall of said bearing and for changing the force applied against said flexible end wall of said bearing includes a force transmitting member disposed in engagement with said flexible end wall and an adjustment screw threaded into said housing and disposed in engagement with said force transmitting member, said adjustment screw being movable relative to said housing to change a force which is applied to said flexible end wall by said force transmitting member,
   said flexible end wall of said bearing and said force transmitting member having circular central surface portions in abutting engagement and radially outward flaring surface portions which flare radially outwardly as they extend axially from said circular central surface portions, said radially outward flaring surface portions of said flexible end wall and said force transmitting member being in abutting contact throughout the extent of said radially outward flaring surface portion of said force transmitting member.

2. A ball joint assembly as defined in claim 1 wherein said adjustment screw has a socket for receiving a tool to rotate said adjustment screw to effect movement of said adjustment screw relative to said housing to change the force applied to said flexible end wall by said force transmitting member.

3. A ball joint assembly comprising:
   a housing having a socket chamber;
   a one-piece bearing disposed in said socket chamber, said bearing having a bearing chamber, a first end portion defining an opening into said bearing chamber, and a second closed end portion opposite said first end portion, said second closed end portion being closed by a flexible end wall of said bearing;
   a ball stud having a head end portion located in said bearing chamber and a shank portion extending out of said housing and out of said bearing chamber through said opening defined by said first end portion of said bearing;
   a retainer disposed in engagement with said first end portion of said bearing, said retainer being effective to press said bearing against a surface on said housing to hold said bearing and head end portion of said ball stud against movement in a direction parallel to a longitudinal central axis of said shank portion of said ball stud; and
   torque adjustment means for adjusting torque required to rotate said ball stud about the central axis of said shank portion of said ball stud, said torque adjustment means including means for applying force against said flexible end wall of said bearing in the direction of said longitudinal central axis and for changing the force applied against said flexible end wall of said bearing;
   said means for applying force against said flexible end wall of said bearing and for changing the force applied against said flexible end wall of said bearing includes a force transmitting member disposed in engagement with said flexible end wall and an adjustment screw threaded into said housing and disposed in engagement with said force transmitting member, said adjustment screw being movable relative to said housing to change a force which is applied to said flexible end wall by said force transmitting member,
   said flexible end wall of said bearing and said force transmitting member having circular central surface portions in abutting engagement and radially outward flaring surface portions which flare radially outwardly as they extend axially from said circular central surface portions, said radially outward flaring surface portions of said flexible end wall and said force transmitting member being in abutting contact throughout the extent of said radially outward flaring surface portion of said force transmitting member.

* * * * *